Figure 1:
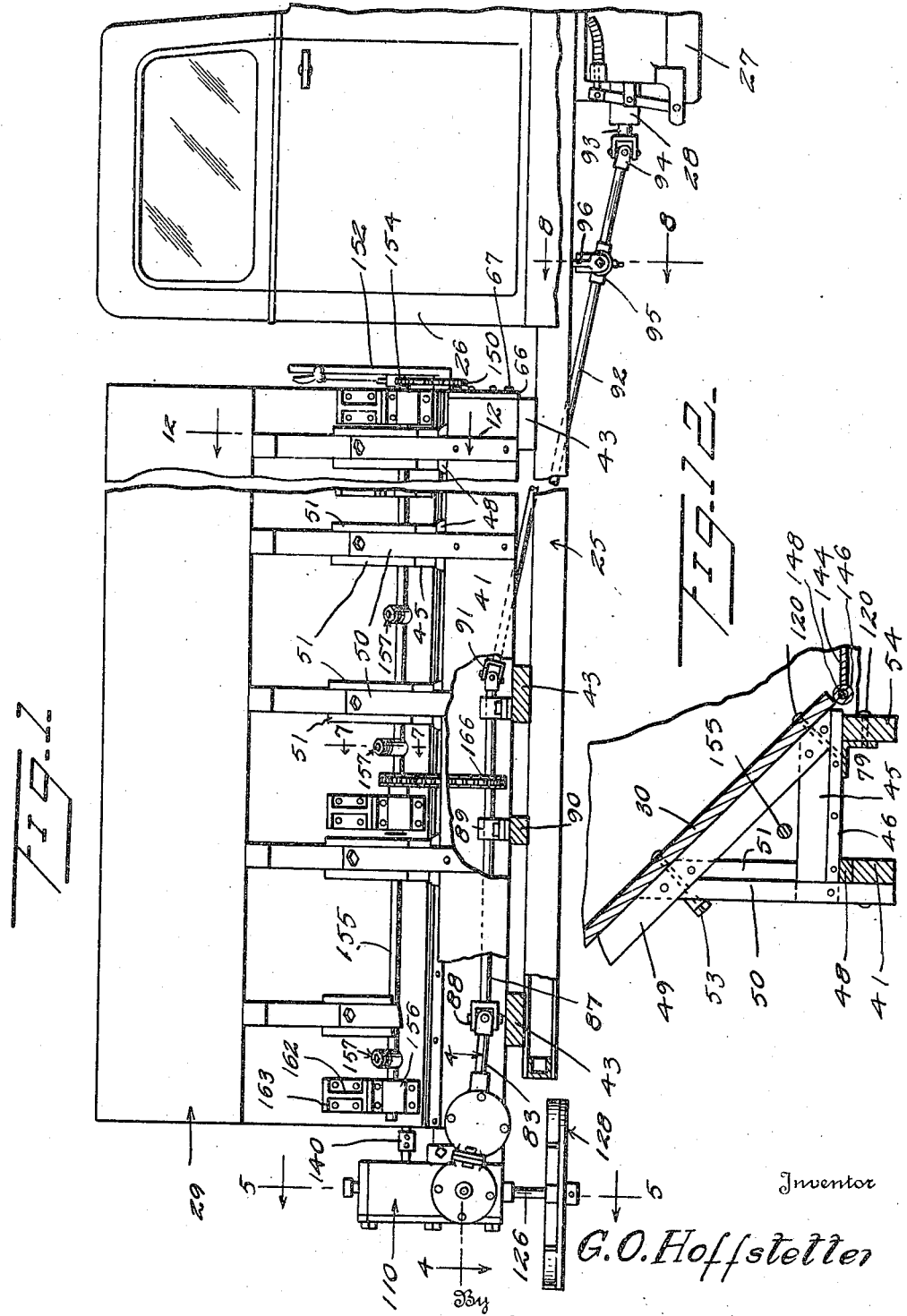

Aug. 25, 1942.  G. O. HOFFSTETTER  2,293,977
MATERIAL SPREADING DEVICE
Filed July 7, 1941  9 Sheets-Sheet 3

Inventor
G. O. Hoffstetter
By Kimmel & Crowell
Attorneys

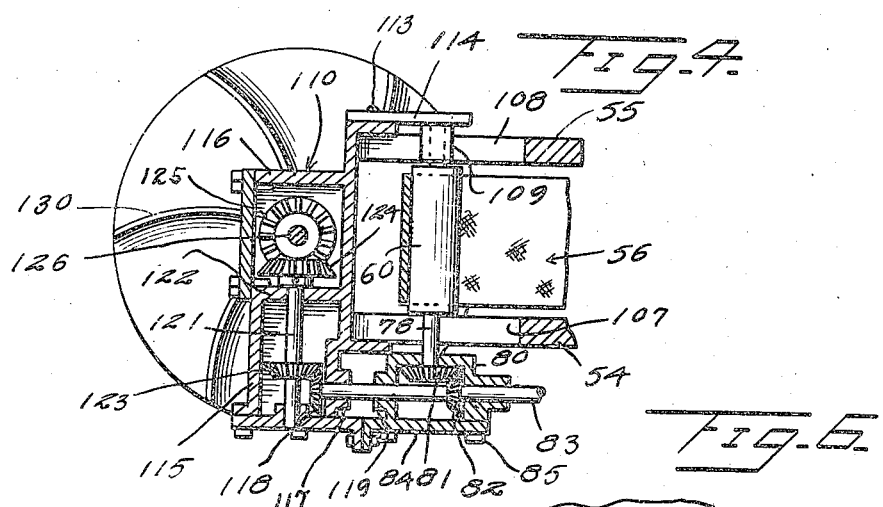

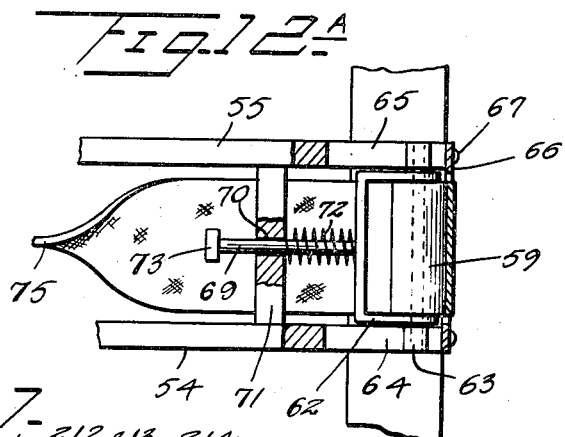
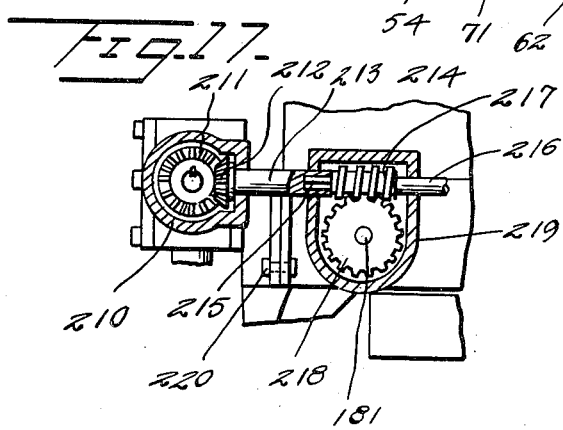
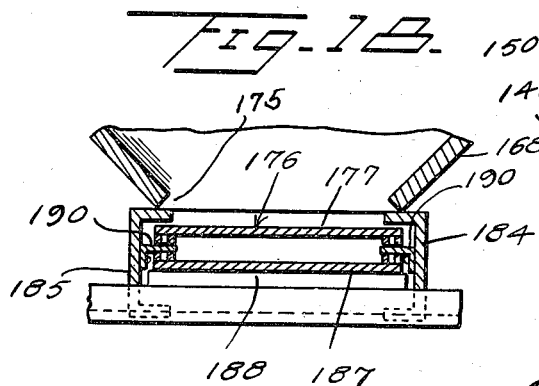

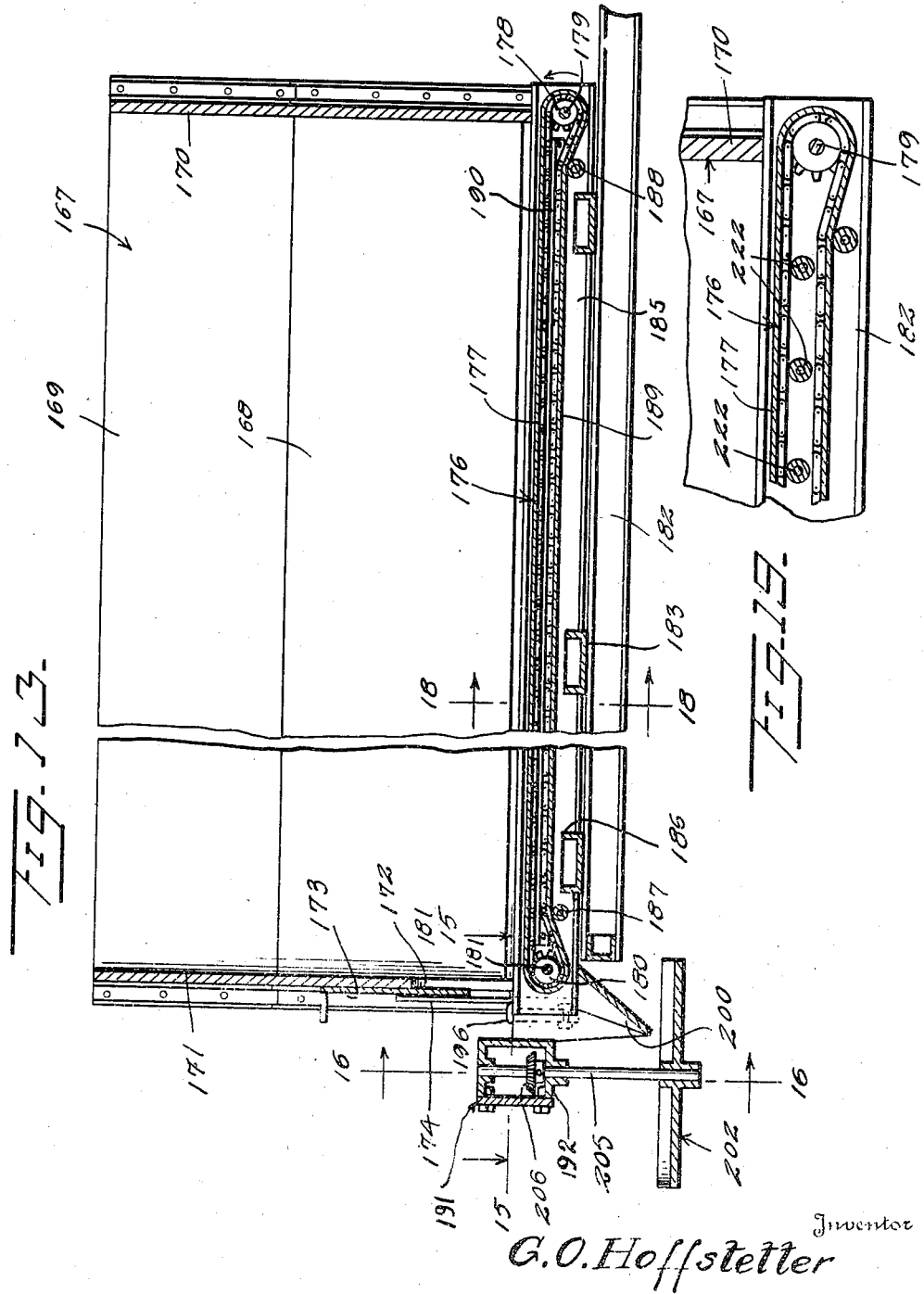

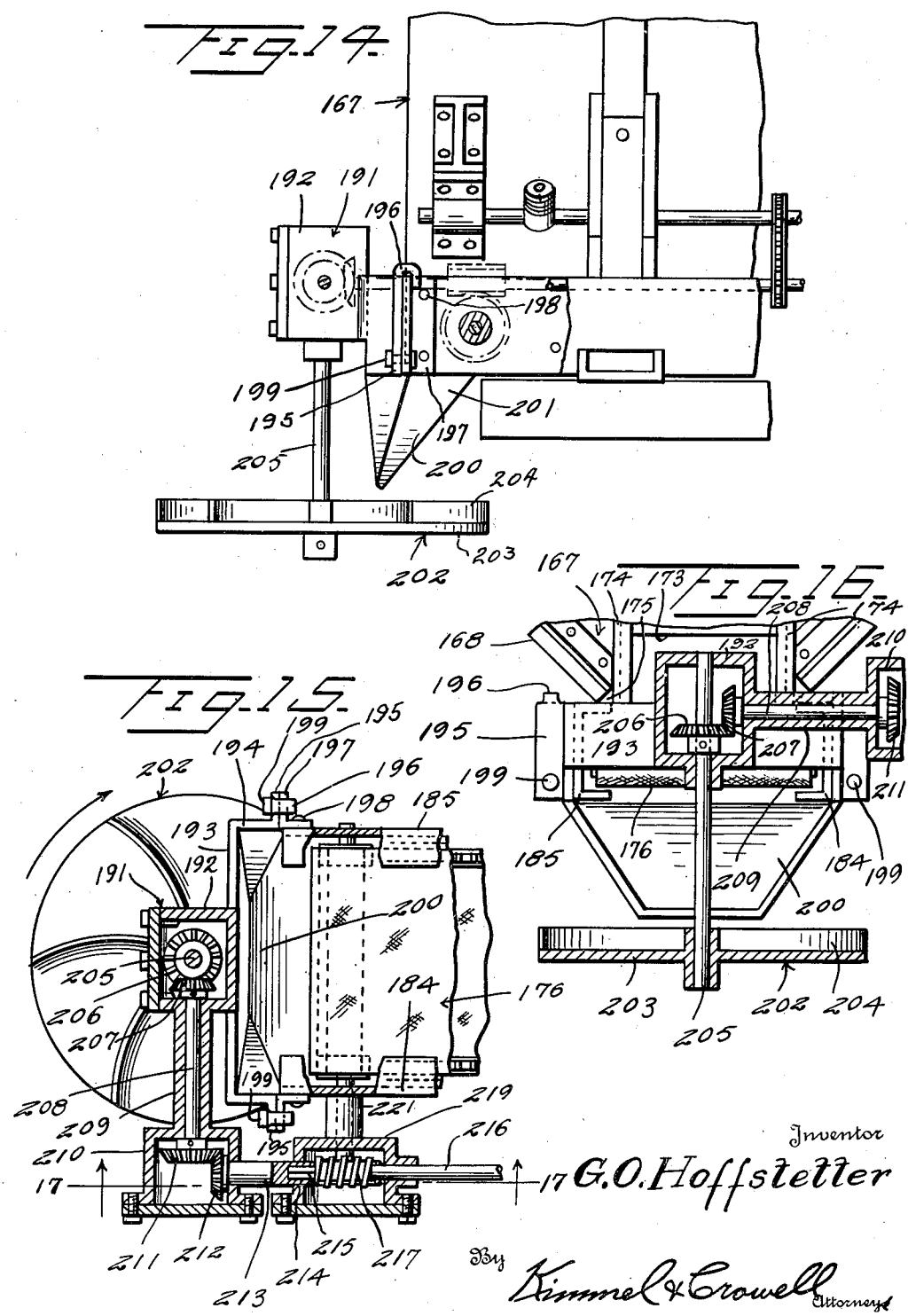

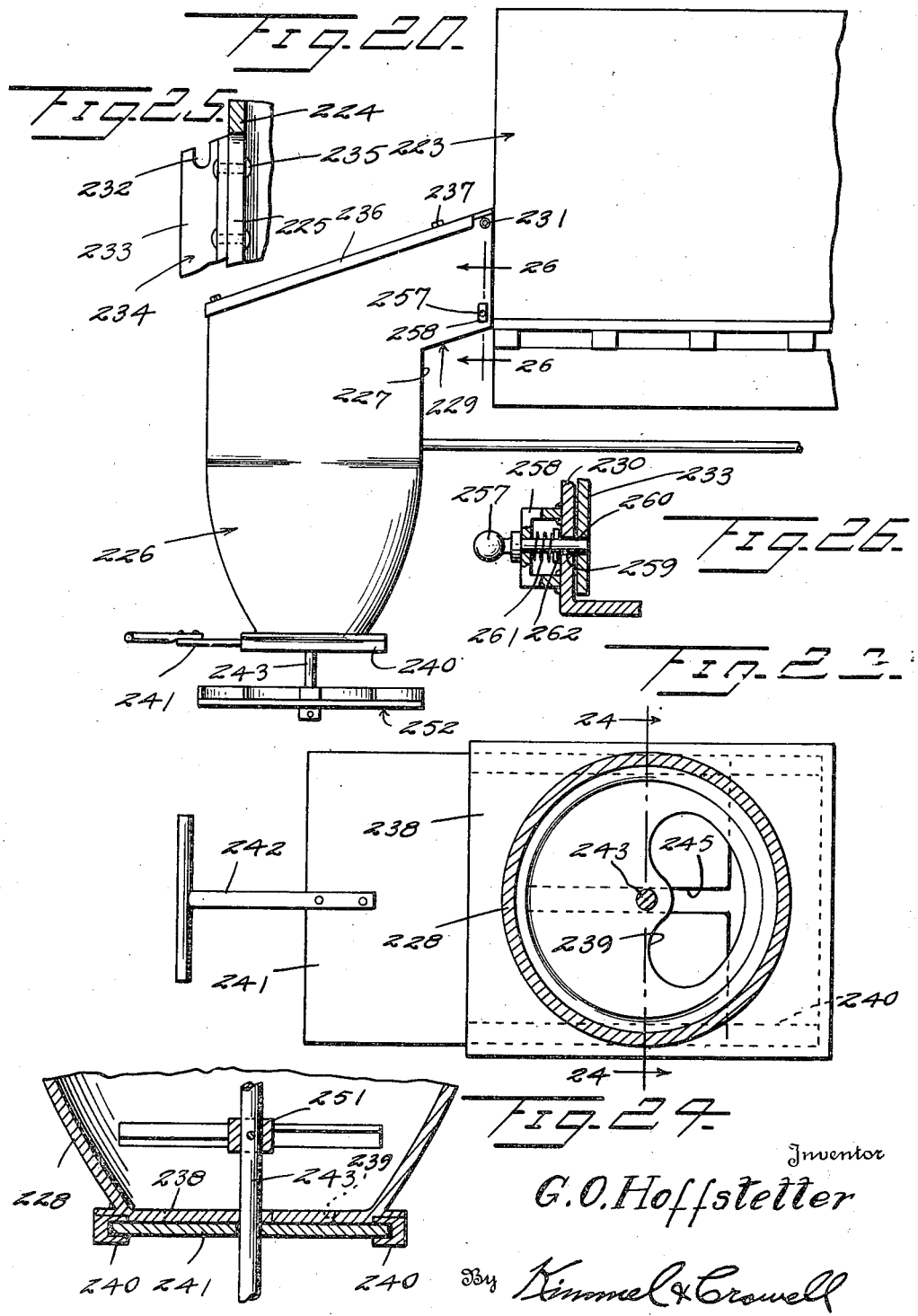

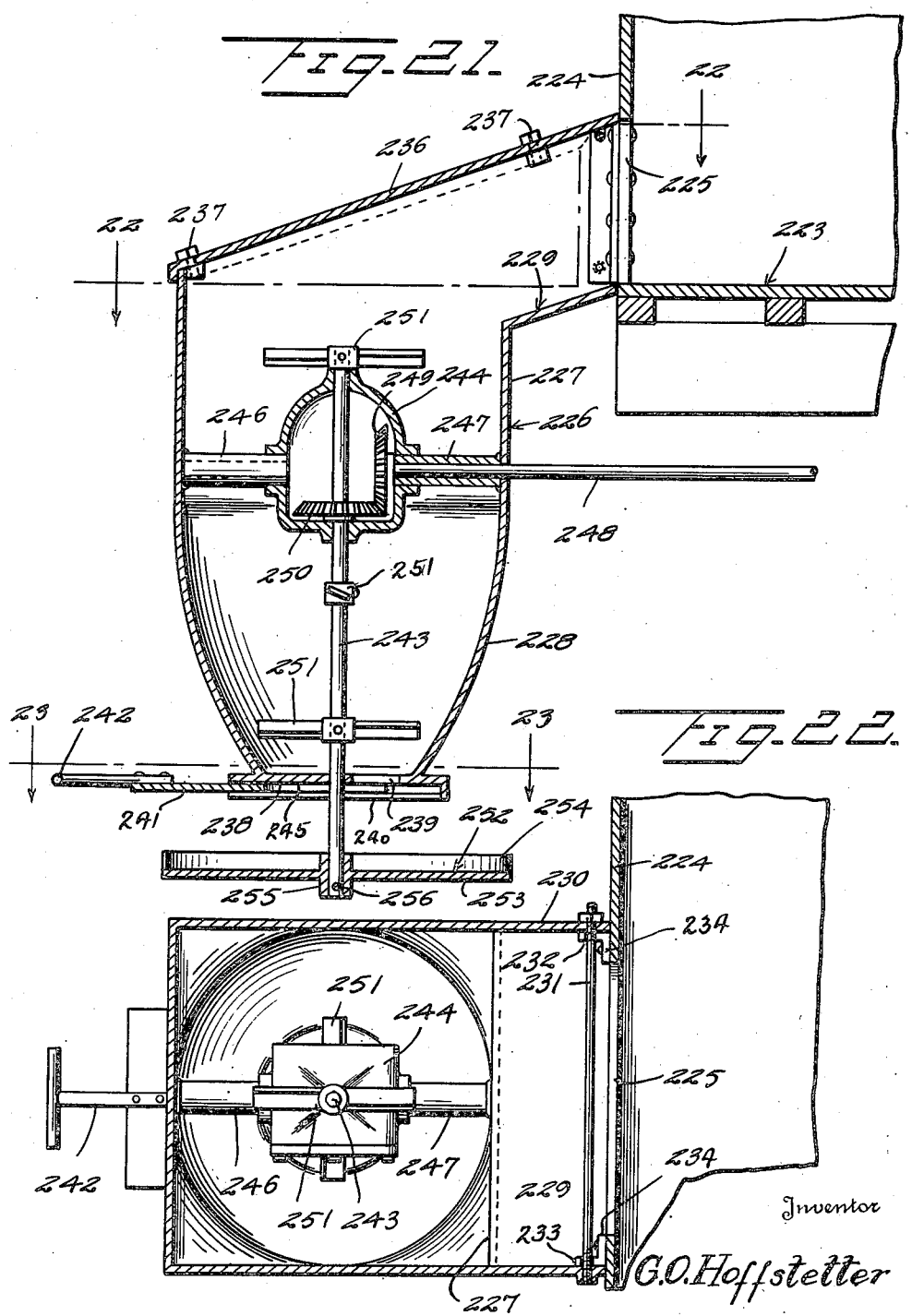

Patented Aug. 25, 1942

2,293,977

UNITED STATES PATENT OFFICE 2,293,977

MATERIAL SPREADING DEVICE

George O. Hoffstetter, Jerseyville, Ill.

Application July 7, 1941, Serial No. 401,362

18 Claims. (Cl. 275—8)

This invention relates to material spreading or broadcasting devices.

An object of this invention is to provide a mobile spreading apparatus for spreading or broadcasting a fertilizer, such as lime, or other granular, comminuted, or crushed material, the spreading structure being connected with the power take-off of a truck or other power device.

Another object of this invention is to provide a device of this kind which is in the form of a two-purpose device, one purpose being for discharging the material in a relatively narrow ribbon on the ground, and the second purpose being for spreading the material in a wide path.

A further object of this invention is to provide a device of this kind which is capable of spreading either dry or moist material.

A further object of this invention is to provide an improved hopper for holding the material and an improved means for agitating the material in the lower portion of the hopper so that the material will be in a condition for easy shifting toward the rear of the hopper.

A further object of this invention is to provide in a device of this kind means for agitating the material in the hopper in such a manner as to prevent caking or packing of the material, and also to provide means for shaking or vibrating the hopper so that the material will readily move downwardly in the hopper toward the agitating and conveying means.

A further object of this invention is to provide an improved conveyor belt and mounting means therefor so that the material will be prevented from clinging to the belt, the belt being so formed as to reverse the operating face thereof during each complete traverse thereof.

A further object of this invention is to provide an improved hopper structure including an improved supporting means therefor so that the hopper and supporting means may be made out of wood, if desired.

A further object of this invention is to provide an improved spreader unit which is so constructed that the unit may be bodily removed from the hopper structure for repair or replacement of the parts thereof.

A further object of this invention is to provide a spreader unit which may be detachably coupled with the hopper structure and with a power source, so that the hopper structure which includes a conveying means may be used either by itself for discharging a narrow ribbon of the material on the ground, or may be combined with the spreader unit for spreading the material in a wide path.

A further object of this invention is to provide in a hopper structure including an endless conveyor belt at the lower portion thereof, an improved means positioned above the belt for regulating the quantity of material discharging from the hopper onto the conveyor.

A further object of this invention is to provide in a hopper structure, an agitator in the lower portion of the hopper, an endless belt conveyor below the agitator, and a regulating means between the agitator and the belt for regulating the amount of material discharged onto the belt, the regulating means being so constructed that it will form side walls above the belt for holding the material onto the belt.

A further object of this invention is to provide in combination a hopper for mounting on a mobile structure, such as a truck chassis or the like, a conveyor for moving the material endwise of the hopper, means for vibrating the hopper to thereby shake the material downwardly onto the conveyor, a regulating gate at the rear or discharging end of the hopper, a removable spreading unit at the rear of the hopper including an improved means for removably mounting the unit on the hopper, and means for detachably coupling the spreader unit with the conveyor operating means.

A further object of this invention is to provide as a new article of manufacture, a spreader unit for detachable mounting on the end gate of a truck body, the unit being operatively coupled with the power take-off of the truck.

A further object of this invention is to provide in a detachable spreader unit for a truck body, an improved means for mounting the unit on the end gate of the truck so that the unit may be quickly and easily mounted on or removed from the truck without the use of tools.

To the foregoing objects and others which may hereinafter appear, the invention consists of the novel construction, combination and arrangement of parts as will be more specifically referred to and illustrated in the accompanying drawings, wherein are shown embodiments of the invention, but it is to be understood that changes, variations and modifications may be resorted to which fall within the scope of the invention as claimed.

In the drawings:

Figure 1 is a detail side elevation partly broken away and in section of a material conveying and spreading apparatus constructed according to an embodiment of this invention.

Figure 2:
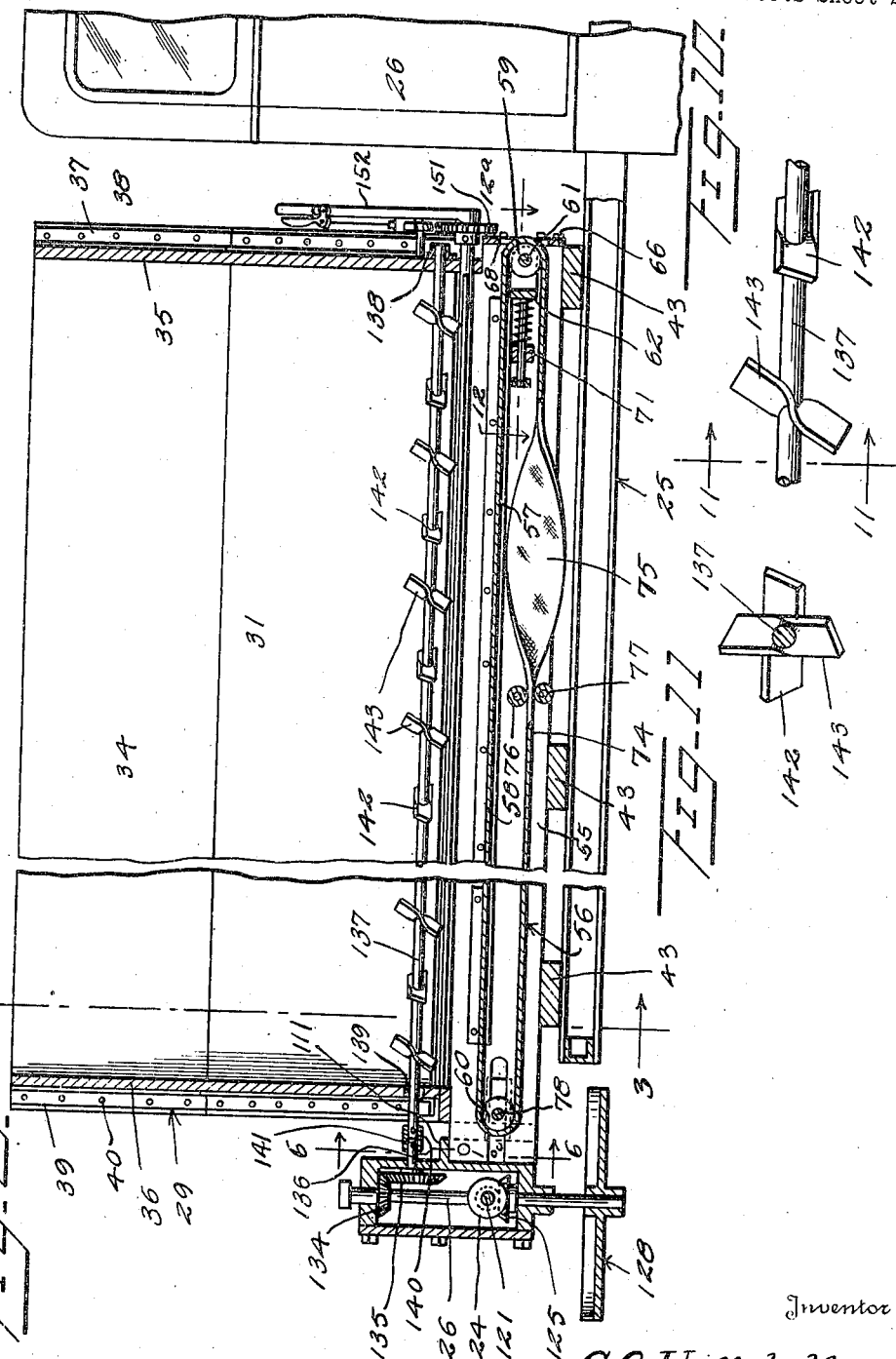
Figure 3:
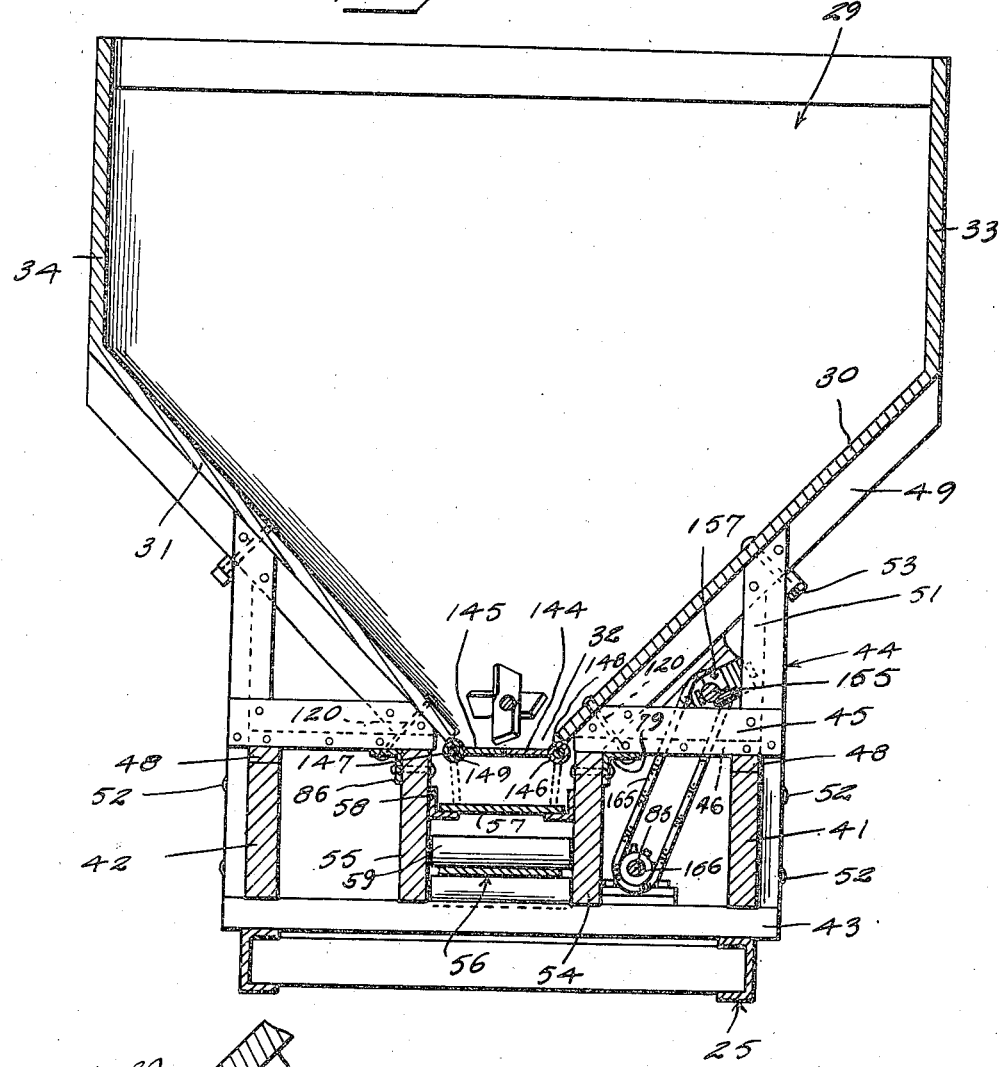
Figure 7:
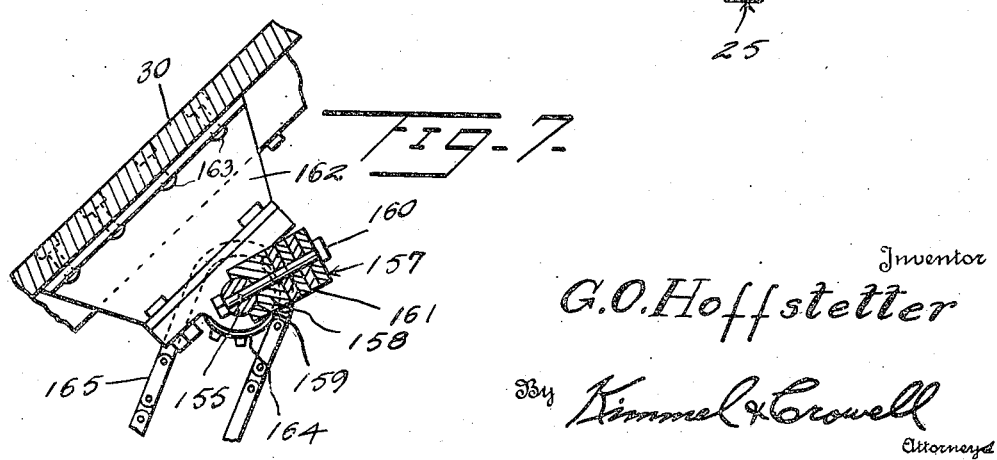

Figure 2 is a longitudinal section taken vertically through the apparatus shown in Figure 1, Figure 3 is a transverse sectional view taken on the line 3—3 of Figure 2, Figure 4 is a sectional view taken on the line 4—4 of Figure 1, Figure 5 is a sectional view taken on the line 5—5 of Figure 1, Figure 6 is a sectional view taken on the line 6—6 of Figure 2, Figure 7 is a sectional view taken on the line 7—7 of Figure 1, Figure 8 is a sectional view taken on the line 8—8 of Figure 1, Figure 9 is a sectional view taken on the line 9—9 of Figure 8, Figure 10 is a fragmentary side elevation of the material agitator, Figure 11 is a sectional view taken on the line 11—11 of Figure 10, Figure 12 is a fragmentary sectional view taken on the line 12—12 of Figure 1, Figure 12a is a sectional view taken on the line 12a—12a of Figure 2, Figure 12b is a fragmentary front elevation of the hopper structure, Figure 13 is a vertical sectional view taken longitudinally through a modified form of this invention, Figure 14 is a fragmentary side elevation of the rear portion of the structure shown in Figure 13, Figure 15 is a sectional view taken on the line 15—15 of Figure 13, Figure 16 is a sectional view taken on the line 16—16 of Figure 13, Figure 17 is a sectional view taken on the line 17—17 of Figure 15, Figure 18 is a sectional view taken on the line 18—18 of Figure 13, Figure 19 is a fragmentary longitudinal section of a modified form of conveyor structure for use with the invention shown in Figure 13, Figure 20 is a detail side elevation partly broken away of a front modification of this invention, Figure 21 is a vertical section of the structure shown in Figure 20, Figure 22 is a sectional view taken on the line 22—22 of Figure 21, Figure 23 is a sectional view taken on the line 23—23 of Figure 21, Figure 24 is a fragmentary sectional view taken on the line 24—24 of Figure 23, Figure 25 is a fragmentary side elevation of the supporting structure for the attachment, and Figure 26 is a sectional view taken on the line 26—26 of Figure 20.

Referring to the drawings, the numeral 25 designates generally a motor truck chassis having a cab 26 at the forward end and a transmission 27 of conventional construction which is provided with a power take-off 28. A hopper structure generally designated as 29 is mounted on the chassis or frame structure 25 with the forward end portion of the hopper structure 29 positioned in rearwardly spaced relation with respect to the cab 26.

The hopper structure 29 which is shown more clearly in Figures 3 and 12 includes a pair of downwardly convergent bottom walls 30 and 31 which have their lower ends spaced apart so as to form a longitudinal discharge opening 32 therebetween. A pair of vertical walls 33 and 34 extend upwardly from the upper or divergent ends of the inclined walls 30 and 31 and front and rear end walls 35 and 36 are secured between the walls 30, 31, 33 and 34. The front wall 35 is secured to the bottom and side wall structure of the hopper 29 by means of angle members 37 which are secured to the end wall 35 and the bottom and side walls of the hopper by fastening devices 38. Preferably, the hopper structure 29 is formed substantially entirely out of wood, although if desired, it may be formed out of metal or the like. The rear end wall 36 is secured to the bottom and side walls of the hopper 29 by means of a pair of angle members 39 which are secured to the bottom and side walls of the hopper and the end wall 36 by fastening devices 40.

The hopper structure 29 is supported from the chassis or frame structure 25 by means of a pair of longitudinal beams 41 and 42 which engage at the lower ends on the upper sides of a plurality of transversely extending supporting members 43. The supporting members 43 rest on and are secured to the sides of the chassis 25. The bottom walls 30 and 31 have secured to the outer sides thereof a plurality of longitudinally spaced apart bracing members generally designated as 44. The bracing members 44 are of like construction and each includes a pair of horizontal boards 45 which have positioned therebetween a lower board 46. The two boards 45 and the lower board 46 form an upwardly opening channel member and the outer end portions of the boards 45 at the lower edges thereof rest on risers 48 which are secured to the upper edges of the longitudinal beams 41 and 42. The inner end portions of the channel forming boards 45 are secured to the opposite faces of an upwardly inclined bracing member 49 which is secured to the outer side of a bottom wall. A vertically disposed bracing member 50 is secured between the outer end portions of the channel forming members 45 and abuts against the outer end portion of the lower channel forming member 46. A pair of vertically disposed boards 51 are secured to the opposite vertical edges of the bracing member 50 and are also secured to the opposite sides of the inclined bracing member 49. The lower ends of the vertical members 51 engage on the upper edges of the vertical channel forming members 45 so that the weight of the hopper will be communicated from the upright members 51 to the horizontal members 45. The vertical bracing member 50 engages on the inner side of the beam 41 and is adapted to be secured thereto by fastening devices 52. The upper end portion of the upright bracing member 50 is secured to the inclined bottom wall 30 of the hopper by means of a bolt 53 as shown in Figure 12.

An intermediate or inner pair of longitudinal beams 54 and 55 are disposed between the outer beams 41 and 42 and are spaced apart a distance slightly greater than the width of the discharge opening 32. The height of each of the beams 54 and 55 is substantially equal to the height of the beams 41 and 42 so that the inner end portions of the channels formed by the boards 45 and 46 will rest on the upper edges of the beams 54 and 55. The inner ends of the lower boards 46 rest on the upper edges of the beams 54 and 55 and the lower ends of the bracing members 49 rest on the inner ends of the boards 46.

An endless or belt conveyor 56 is disposed between the intermediate pair of beams 54 and 55 and has the upper run 57 thereof slidably engaging on a pair of opposed angle-shaped guide members 58 which are fixed to the inner or confronting sides of the beams 54 and 55. The conveyor 56 is substantially equal in length to the length of the hopper 29 and of the discharge opening 32 in the bottom of the hopper and is trained about a pair of rollers 59 and 60. The roller 59 is an idler roller and is rotatably mounted on a shaft 61 which is carried by a U-shaped conveyor tensioning member 62 which is loosely disposed between the beams 54 and 55. The opposite parallel arms of the U-shaped tensioning member 62 are provided with bearings 63 which slidably engage in elongated slots 64 and 65 which are formed in the front end portions of the beams 54 and 55. A cover plate 66 is secured by fastening devices 67 to the forward end portions of the beams 54 and 55 and is provided with a cutout or opening 68 within which a portion of the roller 59 and the belt 56 may loosely engage. A centrally disposed stem 69 is secured to the bight of the U-shaped member 62 and slidably engages through a transversely disposed guide member 71 which is secured between the two beams 54 and 55. A spring 72 engages about the stem 69 and bears at one end against the bight of the U-shaped member 62 and at the other end against the adjacent side of the guide member 71. A head or nut 73 may be carried by the rear end portion of the stem 62 and may constitute a stop to limit the movement of the stem 69 in one direction.

The lower run 74 of the conveyor 56 is formed with a half twist 75 so that at each complete traverse of the belt or conveyor 56 the belt will be reversed with respect to the side thereof confronting the discharge opening 32. In this manner, the loose material which may be moved along the bottom of the hopper 29 by the upper run 57 of the belt will be prevented from caking or sticking to the surface of the belt. The lower run 74 of the belt also engages between a pair of upper and lower idler rollers 76 and 77 which are rotatably disposed between the beams 54 and 55 adjacent the rear portion of the twist 75. The twist 75 in the lower run 74 of the belt is formed by splitting the belt transversely and turning one portion thereof a half turn and then securing the split ends together.

The roller 60 is disposed at the rear of the hopper structure 29 between the beams 54 and 55 and is fixedly secured to a roller shaft 78. The roller shaft 78 extends laterally of the rear portion of the beam 54 into a gear housing 80 and a bevelled gear 81 is fixed to the roller shaft 78 within the housing 80 and is adapted to mesh with a driving gear 82 which is mounted on a driving shaft 83. The housing 80 is formed with a cover 84 secured by fastening devices 85. The shaft 83 extends between the beam 41 and the beam 54 and is connected to a second shaft 87 by means of a universal joint 88. The shaft 87 is journalled in bearings 89 mounted on supporting members 90 and the transverse supporting members 43, and is connected at its forward end by means of a universal coupling 91 to a forwardly and downwardly inclined shaft 92. The shaft 92 is connected at its forward end to the takeoff shaft 93 forming part of the power takeoff 28 by means of a universal coupling 94. The shaft 92 is rotatably mounted in a self-aligning bearing 95 which is carried by a bearing supporting member 96. The bearing 95 with the support 96 is shown in greater detail in Figures 8 and 9 and includes a substantially spherical body 97 formed with a pair of oppositely extending bearing bosses 98 through which the shaft 92 rotatably engages.

The support 96 includes an inverted U-shaped hanger 99 which is formed in one leg 100 thereof with an arcuate socket 101 within which a portion of the body 97 engages. The other arm 102 of the U-shaped hanger 99 has a bolt 103 threaded therethrough which bears against the body 97 at a point diametrically opposite the socket 101. The U-shaped member 99 has secured thereto a plate 104 which may be fastened by fastening devices 105 to a transversely disposed chassis member 106 forming part of the chassis 25.

The two beams 54 and 55 are formed with rearwardly opening slots 107 and 108 respectively. The bearing 109 engages the shaft 78 on the side of the roller opposite from the housing 80 and is slidable in the slot or opening 108. Longitudinal angle members 79 and 86 are secured to the outer sides of the beams 54 and 55 and to the hopper bottom walls by fastening devices 120.

A distributor housing structure generally designated as 110 is disposed at the rear of the hopper structure 29 and is supported from the rear of the beams 54 and 55 by a U-shaped supporting member 111 which is adapted to straddle the beams 54 and 55 and to be secured thereto by fastening members 112. The U-shaped member 111 has fixed thereto as by fastening members 113 a forwardly extending bar or strap 114 to which the bearing 109 is fixed. In this manner the distributor structure 110 may be readily removed as a unit from the hopper 29 by removing the bolts 112, removing one pin from the universal joint 88 and splitting the belt 56.

The distributor 110 includes a laterally disposed gear housing 115 which is cast integral with a second gear housing 116. The housing 115 has journalled therein the rear end portion of the shaft 83 having a bevelled gear 118 secured to the rear end portion thereof. The shaft 83 extends rearwardly through a bearing 119 formed in the housing 80 and through a bearing 117 carried by the forward portion of the housing 115. A horizontally disposed and inwardly extending shaft 121 is journalled in the housing 115 and also projects partly into the housing 116 through a common dividing wall 122. The shaft 121 has fixed thereto within the gear housing 115 bevelled gear 123 which meshes with the bevelled gear 118. A bevelled gear 124 is fixed to the shaft 121 within the housing 116 and is adapted to mesh with a bevelled gear 125 fixed to a spreader shaft 126 which is journalled vertically within the housing 116.

The shaft 126 at its lower end has secured thereto a distributing or broadcasting blade structure generally designated as 128. The blade structure 128 includes a disc or plate 129 which has fixed to the upper face thereof a plurality of longitudinally arcuate plates 130. The distributor or broadcasting member 128 is disposed with a portion thereof beneath the rear end of the conveyor 56 so that the material discharged from the conveyor 56 will strike the front wall 131 of the housing 116 and then drop downwardly towards the center of the distributor 128 and will then be thrown outwardly by centrifugal force so as to scatter or broadcast the material. The plate 129 may be formed with a hub 132 extending above and below the plate 129 and the hub 132 may be fixed to the shaft 126 by means of a pin or fastening member 133.

The vertical shaft 126 has fixed thereto above the bevelled gear 125 a bevelled gear 134 which meshes with a bevelled gear 135 carried by a stub shaft 136 journalled through the front wall 131 of the housing 116 at a point above the distributor supporting member 111. An agitator shaft 137 is disposed lengthwise of the hopper 29 at a point above the conveyor 56 and above the opening 32 in the hopper 29. The forward end portion of the shaft 137 is journalled in a bearing 138 and the rear end portion of the shaft 137 projects through an opening 139 formed in the rear wall 36. The rear end portion of the shaft 137 is coupled to the stub shaft 136 by means of a cylindrical coupling sleeve 140 which telescopes the confronting ends of the stub shaft 136 and the agitator shaft 137. Frangible pins 141 engage through the coupling sleeve 140 and the adjacent ends of the shafts 136 and 137 so that if undue tortional strain is exerted on the agitator shaft 137 one or more of the pins 141 will break and relieve the driving structure for the shaft 137 from any breaking strains. A plurality of oppositely inclined and oppositely pitched agitator blades 142 and 143 are fixed to the shaft 137 in longitudinally spaced apart relation and are provided for the purpose of thoroughly agitating the material in the lower portion of the hopper 29. By providing the blades 142 and 143 with reversely disposed pitches these blades will not move the material lengthwise of the hopper 29, but will thoroughly agitate the material, the blades 142 acting to shift the material in one direction and the blades 143 acting to shift the material in the opposed direction.

In order to provide a means whereby the quantity of material discharged from the opening 32 onto the upper run 57 of the conveyor 56 may be regulated to the desired degree, I have provided a pair of opposed valve members 144 and 145 which when in closed position are adapted to be disposed in a substantially horizontal position as shown in Figure 3. The outer longitudinal edges of the valve members 144 and 145 are formed with tubular members 146 and 147 which are fixed to shafts 148 and 149. The forward end portions of the shafts 148 and 149 have fixed thereto gears 150 and 151 respectively which mesh with each other, and a valve adjusting lever 152 is fixed to the shaft 149 and is provided with a spring-pressed pawl structure 153 engageable with a toothed quadrant 154 which is fixed to the forward end portion of the hopper 29. When the valve members 144 and 145 are disposed in substantially a fully open position, which is the position shown in dotted lines in Figure 3, these valve members will constitute guides disposed above the upper run 57 of the conveyor 56 so as to guide the material on the upper run 57 of the belt 56.

In order to provide a means whereby the material in the hopper 29 may be vibrated so as to permit the use of either dry or moist material and to effect a downward movement of the material towards the discharge opening 32, I have provided a vibrator shaft 155 which is journalled in bearings 156. The shaft 155 has secured thereto a plurality of weights or vibrator members more clearly shown in Figure 7 and generally designated as 157. The vibrators 157 include an inner body 158 formed with an arcuate recess 159 within which the shaft 155 engages. A bolt 160 engages through the shaft 155 and the body 158 and a plurality of discs or superposed weight members 161 engage about the bolt 160 and extend outwardly from the body 158. The vibrator members 157 provide an offset or off-balance weight means which is adapted to shake or vibrate the wall 30 of the hopper 29. The bearings 156 are mounted on a plurality of I-shaped supports 162 which are secured by fastening devices 163 to the outer face of the inclined bottom wall 30. There may be as many of the vibrator members 157 on the shaft 155 as may be desired or considered necessary to provide for the vibration of the hopper 29 to a degree sufficient to shake the material downwardly in the hopper 29. The shaft 155 has fixed thereto a sprocket 164 about which a chain 165 is trained. The shaft 87 also has a sprocket 166 fixed thereto and the chain 165 is trained about the sprocket 166 so that rotation of the shaft 87 will effect rotation of the vibrator shaft 155.

Referring now to Figures 13 to 18 inclusive, the numeral 167 designates generally a hopper structure which is similar to the hopper structure 29 shown in Figures 1, 2 and 3 and which includes downwardly convergent bottom walls 168, vertical side walls 169 and front and rear end walls 170 and 171 respectively. The hopper 167 is formed in the rear wall 171 thereof with a discharge opening 172, and a vertically shiftable gate or valve 173 which is slidable in guide members 174 is adapted to regulate the amount of material which may be discharged through the opening 172. The hopper 167 is formed in the lower portion thereof with a discharge opening 175 which is substantially wider than the opening 32 in the hopper 29 and an endless conveyor member 176 engages below the opening 175 and has the upper run 177 thereof disposed closely adjacent the lower edges of the bottom walls 168. The conveyor 176 may be constructed in the form of a chain conveyor which is mounted on a front sprocket or drum member 178 carried by a shaft 179 and a rear sprocket or drum member 180 fixedly mounted on a shaft 181. The upper run 177 of the conveyor 176 is substantially horizontal and in order to provide a means whereby the height of the hopper 167 with respect to the vehicle chassis 182 may be lowered, I have provided a plurality of transversely disposed supporting members 183 of channel form which are secured at the opposite ends thereof to the longitudinal beams forming the chassis 182. The conveyor 176 movably engages between a pair of opposed channel members 184 and 185 and preferably the channel members 184 and 185 are cut out as at 186 in order to permit the insertion of the transverse channel members 183 within the lower portions of the longitudinal channel members 184 and 185. The channel members 184 and 185 are disposed along the opposite longitudinal edges of the discharge opening 175, and preferably, the conveyor 176 engages adjacent the opposite edges thereof within the channels of the members 184 and 185 as shown in Figure 16.

A pair of idler rollers 187 and 188 are rotatably mounted between the channel members 184, beneath the lower run 189 of the conveyor 176 and hold the lower run 189 in upraised position so that the lower run 189 may readily pass over the upper edges of the transverse channel members 183.

As shown in Figure 13 the upper run 177 of the conveyor 176 may slidably engage at the opposite longitudinal edges thereof a pair of inwardly extending angle bars 190 which are fixedly secured to the vertical webs of the channel members 184 and 185.

A material distributor or spreader generally designated as 191 is mounted at the rear of the hopper 167 and includes a gear housing 192 which has formed integral therewith or fixed thereto a front plate 193 having a pair of forwardly extending flanges 194 formed at their forward terminal edges with outwardly extending flanges 195. The outturned flanges 195 at their upper ends are each formed with a supporting hook 196 which is adapted to engage over the upper edge of an angle bar 197 secured by fastening devices 198 to the outer sides of the channel members 184 and 185. A lower fastening member 199 may engage through a flange 195 adjacent the lower end portion thereof and also through the angle member 197 so that the distributor or spreader member 191 may be firmly mounted on the rear portion of the hopper 167. A downwardly reducing material guiding spout 200 is formed integral with the supporting structure including the plate 193 and the flanges 194 and 195 and extends downwardly therefrom. The forward or upper portion 201 of the spout 200 is adapted to project beneath the rear end portions of the channel members 184 and 185, as shown in Figure 14.

The material which is discharged from the spout 200 is adapted to drop onto the upper surface of a material spreader or broadcasting member 202 which includes a plate 203 and arcuate blades 204. The spreader member 202 is fixedly secured to a vertically disposed rotatable shaft 205 which is journalled in the housing 192 and extends downwardly therefrom. A bevelled gear 206 is fixedly mounted on the shaft 205 in the housing 192 and meshes with a second bevelled gear 207 carried by a stub shaft 208. The shaft 206 is journalled in a laterally projecting bearing 209 carried by the gear housing 192 and terminates in a laterally disposed gear housing 210. A bevelled gear 211 is secured to the outer end portion of the shaft 208 and meshes with a bevelled gear 212 carried by a stub shaft 213. The stub shaft 213 has a coupling socket 214 in its forward end in which is received a splined rear end 215 of a drive shaft 216.

The drive shaft 216 has fixedly mounted thereon a worm 217 which meshes with a worm gear 218 mounted in a worm gear housing 219. The worm gear 218 is fixedly secured to the roller or sprocket shaft 181 for rotating the drum or sprocket member 180. The housing 219 is formed on its inner side with a bearing bushing 221 within which the shaft 181 rotatably engages. In Figure 19 there is shown a slightly modified form of this invention wherein the chain conveyor 176 is mounted in the lower portion of the hopper 167 and the upper run 177 of the conveyor 176 engages a plurality of longitudinally spaced apart parallel rollers 222 which are mounted between the longitudinal channel members 184 and 185. In other respects the structure shown in Figure 19 will embody the same structure as shown in Figures 13 to 18 inclusive.

Referring now to Figures 20 to 26 inclusive, there is disclosed a further modification of this invention in the form of a distributor or spreader attachment for the rear end of a truck body. The truck body is shown fragmentarily in Figures 20, 21 and 22 and is generally designated as 223. The body 223 includes a rear wall 224 which is formed with an opening 225 through which the material in the form of lime or the like, may be discharged. Preferably, the material may be shovelled into an opening 225, and this material will then drop downwardly into a hopper, generally designated as 226. The hopper 226 includes an upper hopper body 227 which is substantially rectangular in plan, and a lower hopper body 228 of substantially inverted dome-shaped configuration. The upper body 227 is formed with a forwardly projecting chute 229 which is adapted to register with the discharge opening 225. The side walls 230 of the chute 229 have secured thereto a transversely disposed supporting member 231 in the form of a pipe or elongated bar which is adapted to engage in an upwardly opening notch 232 carried by the rearwardly projecting side 233 of an angle member 234. There are two of these angle members 234 secured by fastening devices 235 to the gate or rear wall 224 and the rearwardly projecting sides 233 are adapted to engage against the inner faces of the side walls 230 of the chute 229. The upper portion of the hopper 226 is preferably closed by means of a closure plate 236 which also engages over the top of the chute 229 and is secured to the hopper body 226 and the chute 229 by fastening devices 237.

The lower hopper body 228 is formed with a bottom wall 238 having a delivery or discharge opening 239 in the forward portion thereof. The bottom wall 238 preferably projects outwardly beyond the lower portion of the hopper body 228, as shown in Figure 21, and has secured to the under side thereof a pair of channel-shaped guide members 240 within which a slidable valve 241 engages. The rear portion of the valve 241 may be provided with a handle structure 242 so that the valve structure 241 may be manually operated to either open or close the discharge or delivery opening 239.

A vertically disposed distributor shaft 243 is rotatably disposed in the hopper member 226, being journalled in a gear housing 244. The shaft 243 projects downwardly below the housing 244 and through the bottom wall 238. Preferably, the valve member 241 is formed with an elongated slot 245 which engages on opposite sides of the shaft 243 so as to permit the sliding movement of the valve member 241. The gear housing 244 is supported within the hopper body 226 by means of a pair of supporting members 246 and 247. The supporting member 247 is preferably hollow and constitutes a bearing for the drive shaft 248. The drive shaft 248 is adapted to be connected to a suitable power take-off forming part of the truck structure 223. The rear end portion of the shaft 248 has fixed thereto a bevel gear 249 which meshes with a bevel gear 250 fixed to the vertical shaft 243. The gears 249 and 250 are rotatable within the gearing housing 244. A plurality of superposed agitator blades 251 are fixed, in vertical spaced relation on the shaft 243 and, in the present instance, two of the blades 251 are disposed below the gear housing 244 and another or upper blade 251 is disposed on the upper end of the shaft 243. The lower end of the shaft 243 has fixed thereto a distributor member 252 including a disc-shaped plate 253 and a plurality of arcuate blades 254 fixed to the upper side of the plate 253. The central portion of the plate 253 is formed with a bushing 255 which may be fixed by fastening member 256 to the lower end of the shaft 243.

In order to provide a means whereby the hopper or spreader unit 226 may be securely locked on the supporting angle members 234, I have provided a spring pressed locking pin 257 which is slidable through a substantially U-shaped support or housing 258 fixed to a side 230 of the chute 229. There are two of these locking pins 257 adjacent the lower portions of the two side walls 230 of the chute 229 and each side wall 230 is formed with an opening 259 through which the pin 257 loosely engages. The rearwardly projecting side 233 is formed with an opening 260 adapted to register with the opening 259 so that the inner portion of the pin 257 may engage in the opening 260. The pin 257 is constantly urged to a locking position by means of a spring 261 which has one end thereof bearing against the bite of the U-shaped member 258 and the other end thereof bearing against a washer or pin 262 mounted on the pin 257.

What I claim is:

1. A material spreading apparatus comprising in combination a hopper body for mounting on a truck chassis, said body having a discharge opening in the lower portion thereof, an endless conveyor having one run thereof disposed below said opening and movable toward the rear of the hopper, a material agitator in said hopper above said conveyor, a spreader unit disposed at the rear of said hopper for receiving the material from said conveyor, means operatively connecting said unit with said agitator, means connecting said unit with a power source, said latter means including an operative connection with said conveyor and means carried by said hopper for bodily agitating said hopper.

2. A material spreading apparatus comprising in combination a hopper body for mounting on a truck chassis, said body having a discharge opening in the lower portion thereof, an endless conveyor having one run thereof disposed below said opening and movable toward the rear of the hopper, a material agitator in said hopper above said conveyor, means carried by said hopper for bodily agitating said hopper, a pair of opposed regulating members rockably carried by said hopper and interposed between said first agitator and said conveyor for regulating the quantity of material discharged through said opening onto said conveyor, means for adjusting said members, a spreader unit disposed at the rear of said hopper for receiving the material from said conveyor, means operatively connecting said unit with said first agitator, means connecting said unit with a power source, said latter means including an operative connection with said conveyor.

3. A material spreading apparatus comprising in combination a hopper body for mounting on a truck chassis, said body having a discharge opening in the lower portion thereof, an endless conveyor having one run thereof disposed below said opening and movable toward the rear of the hopper, a material agitator in said hopper above said conveyor, a pair of opposed regulating members rockably carried by said hopper and interposed between said agitator and said conveyor for regulating the quantity of material discharged through said opening onto said conveyor, means for adjusting said members, said members being rockable downwardly to material discharging position and also constituting guide means when in open position for the material engaging on said conveyor, a spreader unit disposed at the rear of said hopper for receiving the material from said conveyor, means operatively connecting said unit with said agitator, means carried by said hopper for bodily agitating said hopper, means connecting said unit with a power source, said latter means including an operative connection with said conveyor.

4. A material spreading apparatus comprising a hopper for mounting on a truck chassis, said hopper including a pair of downwardly convergent bottom walls having their lower ends spaced apart to provide a discharge opening, an outer pair of longitudinal beams below said hopper, an inner pair of longitudinal beams below said hopper and disposed on opposite sides of said opening, an endless conveyor disposed between said inner pair of beams, operating means for said conveyor, means rotatably carried by one of said bottom walls for vibrating the hopper, and means connecting said latter means with said operating means.

5. A material spreading apparatus comprising a hopper for mounting on a truck chassis, said hopper including a pair of downwardly convergent bottom walls having their lower ends spaced apart to provide a discharge opening, an outer pair of longitudinal beams below said hopper, an inner pair of longitudinal beams below said hopper and disposed on opposite sides of said opening, an endless conveyor disposed between said inner pair of beams, operating means for said conveyor, a vibrator shaft disposed in parallel relation to one of said bottom walls, means rotatably supporting said shaft from said one bottom wall, means connecting said shaft with said operating means, and a plurality of hopper vibrating elements fixed to said shaft, each element comprising a weighted body having an arcuate cutout in which said shaft engages, a plurality of weighted plates, and means securing said plates and body to said shaft.

6. In combination, a hopper having an elongated discharge opening in the lower portion thereof, an endless conveyor belt having an upper run confronting said opening, said belt having the lower run thereof twisted for reversing the conveying surface during each complete traverse thereof and means below said upper run for maintaining the twist in the lower run.

7. In combination, a hopper having an elongated discharge opening in the lower portion thereof, means carried by said hopper and agitating said hopper, an endless conveyor belt having an upper run confronting said opening, rollers at each end of said belt and engaging between the upper and lower runs thereof, the lower run of said belt being twisted in a manner whereby to provide for reversing the conveying surface during each complete traverse of the belt, and a pair of idler rollers engaging on opposite faces of said lower run adjacent one end of the twisted portion thereof.

8. A material spreading apparatus comprising a hopper for mounting on a truck chassis, said hopper including downwardly convergent walls having their lower ends spaced apart to provide a discharge opening, an endless conveyor below said opening, means for maintaining said conveyor taut, and means carried by said hopper for vibrating said hopper whereby the material therein will gravitate toward said opening.

9. A material spreading apparatus comprising a hopper, said hopper including downwardly convergent walls having their lower ends spaced apart to provide a discharge opening, an endless flexible conveyor below said opening, tensionable means for maintaining said conveyor taut, means carried by said hopper for vibrating said hopper whereby the material therein will gravitate toward said opening, and a material spreading element at one end of said hopper for receiving and spreading the material moved by said conveyor.

10. A material spreading apparatus comprising a hopper provided with a lower discharge opening, an endless conveyor below said opening, operating means for said conveyor, and means carried by said hopper connected with said operating means for bodily agitating said hopper.

11. A material spreading apparatus comprising a hopper provided with a lower discharge opening, an endless conveyor below said opening, operating means for said conveyor, means carried by said hopper connected with said operating means for bodily agitating said hopper, and a material spreading means carried by said hopper.

12. A material spreading apparatus comprising a hopper provided with a lower discharge opening, an endless conveyor below said opening, operating means for said conveyor, means carried by said hopper connected with said operating means for bodily agitating said hopper, a material spreading means carried by said hopper, and means detachably securing said spreading means on said hopper.

13. A material spreading apparatus comprising a hopper provided with a lower discharge opening, an endless conveyor below said opening, tensionable means for maintaining said conveyor taut, operating means for said conveyor, means carried by said hopper connected with said operating means for bodily agitating said hopper, and means within said hopper for agitating the material adjacent said opening.

14. In combination, a hopper having an elongated discharge opening in the lower portion thereof, an endless conveyor belt having an upper run confronting said opening and having the lower run thereof twisted for reversing the conveying surface during each complete traverse thereof, means carried by said hopper for vibrating the latter, and automatically operable means for maintaining said belt taut.

15. In combination, a hopper having an elongated discharge opening in the lower portion thereof, an endless conveyor belt having an upper run confronting said opening and having the lower run thereof twisted for reversing the conveying surface during each complete traverse thereof, means for maintaining said belt taut, means carried by said hopper for vibrating the latter, and means carried by said hopper for receiving the material from said upper run of said belt and spreading the material rearwardly and laterally of said hopper.

16. In combination, a hopper having an elongated discharge opening in the lower portion thereof, an endless conveyor belt having an upper run confronting said opening and having the lower run thereof twisted for reversing the conveying surface during each complete traverse thereof, means for maintaining said belt taut, means carried by said hopper for receiving the material from said upper run of said belt and spreading the material rearwardly and laterally of said hopper, and means carried by said hopper for bodily agitating said hopper.

17. In combination, a hopper having an elongated discharge opening in the lower portion thereof, an endless conveyor belt having an upper run confronting said opening and having the lower run thereof twisted for reversing the conveying surface during each complete traverse thereof, means for maintaining said belt taut, means carried by said hopper for receiving the material from said upper run of said belt and spreading the material rearwardly and laterally of said hopper, means carried by said hopper for bodily agitating said hopper, and means within said hopper for agitating the material adjacent said opening.

18. In combination, a hopper having an elongated discharge opening in the lower portion thereof, an endless conveyor belt having an upper run confronting said opening and having the lower run thereof twisted for reversing the conveying surface during each complete traverse thereof, tensionable means for maintaining the said belt taut, means carried by said hopper for receiving the material from said upper run of said belt and spreading the material rearwardly and laterally of said hopper, means carried by said hopper for bodily agitating said hopper and means within said hopper for agitating the material adjacent said opening.

GEORGE O. HOFFSTETTER.